March 9, 1965  J. C. DAVIDSON  3,173,025
CAPACITOR TIMING NETWORK INCLUDING ZENER DIODE FOR REGULATING
THE VOLTAGE SWING WHEN CAPACITOR CHARGES AND DISCHARGES
Filed Nov. 3, 1961  3 Sheets-Sheet 1
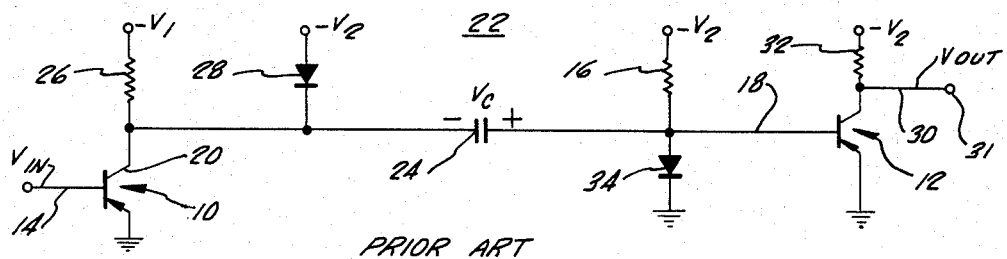
PRIOR ART
FIG. 1
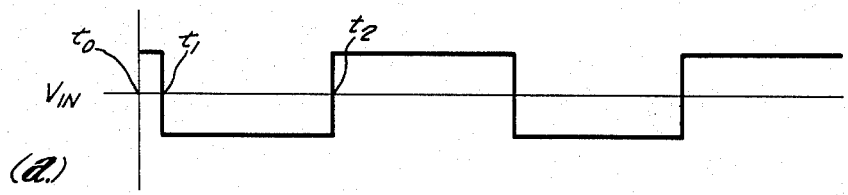
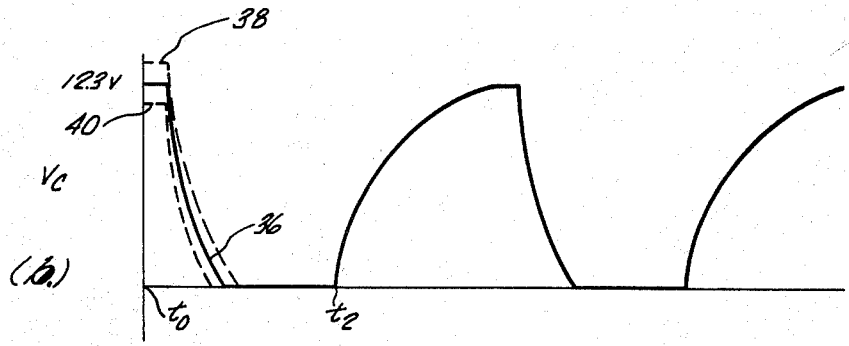
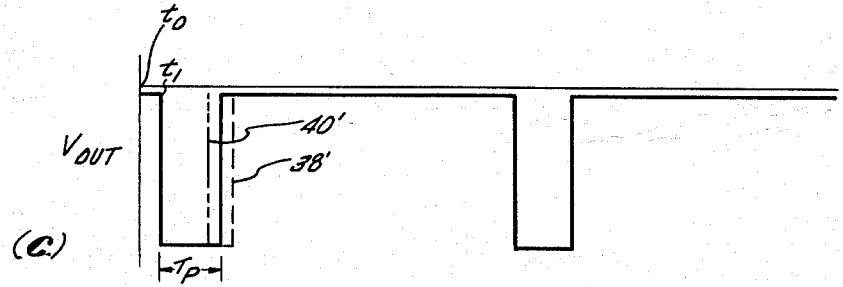
FIG. 2
INVENTOR.
JAMES C. DAVIDSON
BY
Christie, Parker & Hale
ATTORNEYS.

March 9, 1965  J. C. DAVIDSON  3,173,025
CAPACITOR TIMING NETWORK INCLUDING ZENER DIODE FOR REGULATING
THE VOLTAGE SWING WHEN CAPACITOR CHARGES AND DISCHARGES
Filed Nov. 3, 1961  3 Sheets-Sheet 2
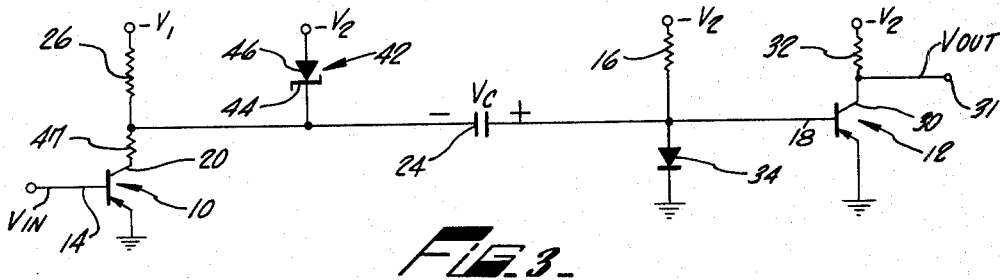
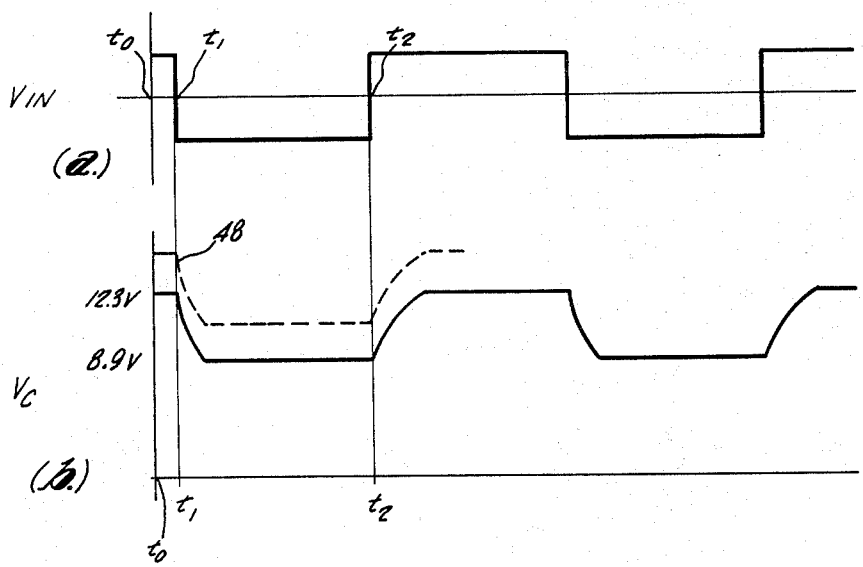
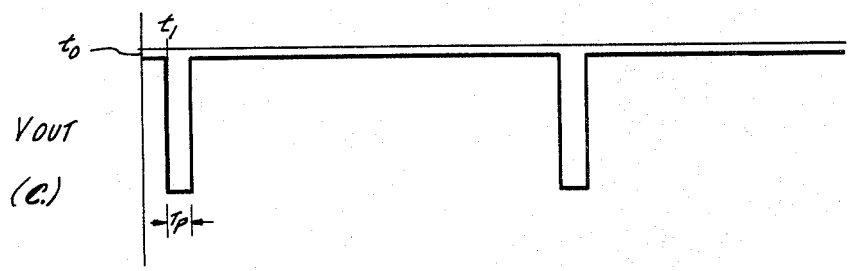
INVENTOR.
JAMES C. DAVIDSON
BY
Christie, Parker & Hale
ATTORNEYS.

March 9, 1965   J. C. DAVIDSON   3,173,025
CAPACITOR TIMING NETWORK INCLUDING ZENER DIODE FOR REGULATING
THE VOLTAGE SWING WHEN CAPACITOR CHARGES AND DISCHARGES
Filed Nov. 3, 1961   3 Sheets-Sheet 3
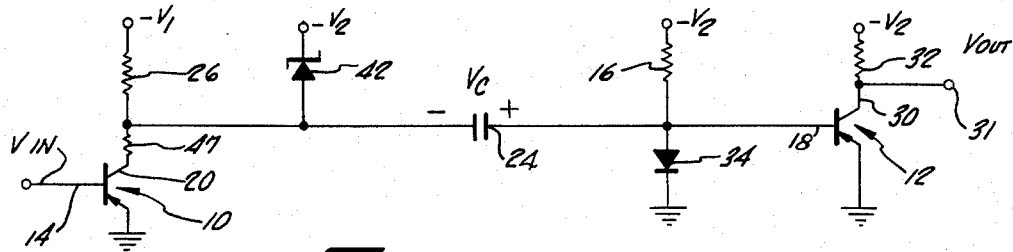
Fig. 6
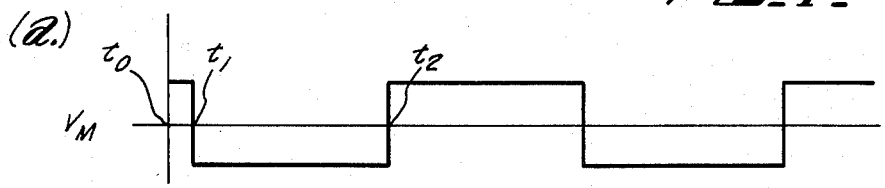
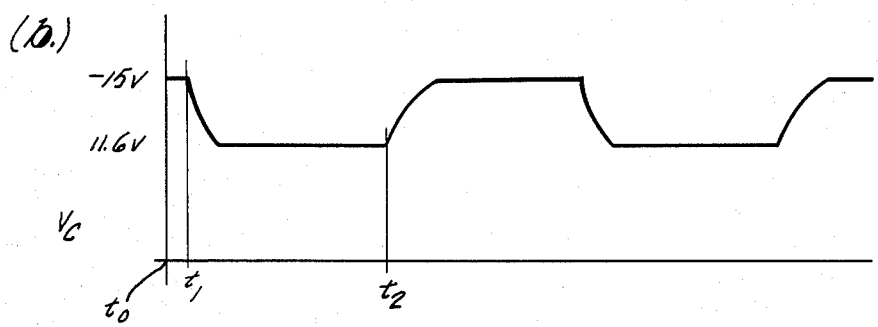
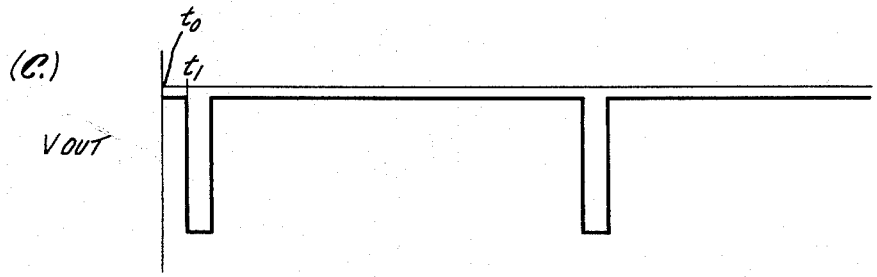
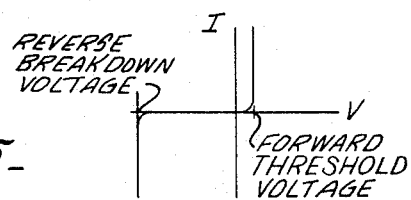
Fig. 5
INVENTOR.
JAMES C. DAVIDSON
BY
Christie, Parker & Hale
ATTORNEYS.

3,173,025
CAPACITOR TIMING NETWORK INCLUDING ZENER DIODE FOR REGULATING THE VOLTAGE SWING WHEN CAPACITOR CHARGES AND DISCHARGES
James C. Davidson, Glendora, Calif., assignor to Burroughs Corporation, Detroit, Mich., a corporation of Michigan
Filed Nov. 3, 1961, Ser. No. 149,930
8 Claims. (Cl. 307—88.5)

This invention is directed to improvements in electrical timing networks and, more particularly, to an improved capacitor timing network for developing an output signal, the timing of which is unchanged by variations in power supply which affect the level of the biasing potentials applied to the timing network.

In many electronic systems, and particularly in digital computers, accurate timing of electrical signals is of prime importance. One electrical network commonly employed to control the timing of electrical signals is a capacitor timing network. Generally, a capacitor timing network includes means for initiating an output signal in response to an input signal applied to the network and means for controlling the timing of the output signal in response to the charge or discharge of a capacitor. Since the timing of the output signals developed by the timing network is dependent upon the charge or discharge time of a capacitor, to maintain uniform timing for the output signals it is necessary that a substantially constant voltage swing be maintained across the capacitor when charging and discharging. Thus, if the capacitor is initially charged to a predetermined voltage and is to be discharged to zero voltage, to maintain uniform timing for the output signal it is necessary that the voltage swing across the capacitor remain equal to the predetermined voltage and unaffected by circuit variations such as changes in the value of the biasing potentials applied to the timing network.

In the past, to regulate the voltage level of a capacitor in a capacitor timing network, it has been a practice to utilize a diode having its cathode coupled to the capacitor and its anode coupled to a source of biasing potential. In this manner the forward threshold voltage of the diode determines the voltage across the capacitor when charged.

The addition of the diode to the capacitor timing network provides regulation of the voltage swing across the capacitor so long as the value of the biasing potential coupled to the diode remains constant. However, with variations in power supply which affect the value of the biasing potentials applied to the timing network, the level of the biasing potential coupled to the diode changes. Changes in the level of the biasing potential coupled to the diode in turn result in changes in the voltage level to which the capacitor may be charged thereby causing the charge and discharge time of the capacitor to vary. Since the charge or discharge time of the capacitor controls the timing of the output signal developed by the capacitor timing network, variations in the charge and discharge time of the capacitor produce undesired variations in the timing of the output signals.

The present invention, on the other hand, provides a capacitor timing network for developing an output signal, the timing of which is substantially unchanged by variations in power supply which affect the level of the biasing potentials applied to the timing network.

Briefly, to accomplish this a capacitor timing network of the present invention in a basic form includes a zener diode to regulate the voltage swing across the capacitor when charging and discharging. As is commonly known, a zener diode possesses a predetermined forward threshold voltage and a predetermined reverse breakdown voltage. The zener diode is coupled between the capacitor and a source of biasing potential such that the voltage level to which the capacitor may be charged and discharged is accurately regulated by the voltage characteristics of the zener diode. In this manner the voltage swing across the capacitor when charging and discharging is maintained at a constant voltage magnitude independent of variations in power supply which affect the biasing potentials applied to the timing network and equal to a sum of the forward threshold voltage and reverse breakdown voltage of the zener diode.

Generally, in capacitor timing networks a capacitor is charged through a biasing resistor coupled between the capacitor and a source of biasing potential and is discharged in response to an input signal applied to the capacitor through an output circuit coupled to the capacitor. In one embodiment of the present invention, the cathode of a zener diode is coupled to a junction of the resistor and the capacitor while the anode of the zener diode is coupled to a source of biasing potential which is positive relative to the biasing potential coupled to the resistor. In this manner the voltage level to which the capacitor is charged is determined by the forward threshold voltage of the zener diode while the voltage level to which the capacitor is discharged is determined by the reverse breakdown voltage of the zener diode. Thus, the voltage swing across the capacitor in charging and discharging is equal to a sum of the forward threshold voltage and reverse breakdown voltage of the zener diode and is unaffected by changes in the level of the biasing potentials applied to the capacitor timing network.

In another embodiment of the present invention, the anode of a zener diode is coupled to a junction of the biasing resistor and the capacitor while the cathode of the zener diode is coupled to a source of biasing potential which is positive relative to the biasing potential coupled to the resistor. In this manner the voltage level to which the capacitor is charged is determined by the reverse breakdown voltage of the zener diode and the voltage level to which the capacitor is discharged is determined by the forward threshold voltage of the zener diode. Thus, in charging and discharging, the voltage on the capacitor traverses a voltage magnitude equal to a sum of the forward threshold voltage and the reverse breakdown voltage of the zener diode, which voltage range is unaffected by changes in the level of biasing potentials applied to the capacitor timing network.

Accordingly, by utilizing both the forward and reverse characteristics of the zener diode, the voltage swing on the capacitor of a capacitor timing network is made independent of power supply variations thereby providing accurately timed output signals at the output of the capacitor timing network.

The above, as well as other features of the present invention, may be more clearly understood by reference to the following detailed description when considered with the drawings in which:

FIGURE 1 is a schematic representation of a capacitor timing network employing the prior art type of diode voltage regulation;

FIGURE 2 is a graphical representation of the waveforms associated with the prior art configuration represented in FIGURE 1;

FIGURE 3 is a diagrammatic representation of one form of the present invention;

FIGURE 4 is a graphical representation of the waveforms associated with the configuration of FIGURE 3;

FIGURE 5 is a graphical representation of the voltage characteristics of a zener diode;

FIGURE 6 is a diagrammatic representation of another form of the present invention; and FIGURE 7 is a graphical representation of the waveforms associated with the configuration of FIGURE 6.

Referring to FIGURE 1, there is shown a capacitor timing network employing the prior art type of diode arrangement for regulating the voltage swing across a capacitor. Briefly, the timing network includes means for initiating an output signal in response to an input signal applied to the timing network and means for controlling the timing of the output signal in response to the discharge of a capacitor.

More particularly, the timing network includes an input transistor 10 and an output transistor 12, both arranged in a grounded emitter configuration. The input transistor 10 is normally nonconducting and is controlled to operate as a switch in response to a pulsating input signal applied to its base or input terminal 14. The output transistor 12 is normally conducting through a biasing resistor 16 which is coupled between a base terminal 18 and the transistor 12 and a source of biasing potential represented as $-V_2$.

Coupled between a collector terminal 20 of the input transistor 10 and the base terminal 18 of the output transistor 12 is a capacitor timing network represented generally at 22. The capacitor timing network 22 includes a capacitor 24 coupled between the collector 20 and the base 18 and a biasing resistor 26 coupled to a junction of the capacitor 24 and the collector 20 and a source of biasing potential represented as $-V_1$.

To regulate the voltage swing across the capacitor 24 when discharging and charging, the capacitor timing network 22 includes a diode 28. Th diode 28 has its cathode coupled to a junction of the collector 20 and the capacitor 24 and its anode coupled to the source of biasing potential $-V_2$.

The source of biasing potential $-V_2$ has a magnitude which is less than the magnitude of the source of biasing potential $-V_1$. Accordingly, with the input transistor 10 nonconducting, the capacitor 24 is charged by a current flowing from the base 18 of the transistor 12 to one side of the capacitor 24 and from the other side of the capacitor through the biasing resistor 26 to the source of biasing potential $-V_1$. Due to the diode 28, however, the voltage level to which the capacitor 24 may be charged is limited. In particular, the voltage across the capacitor 24 is determined by the voltage level of the collector 20 and the base 18. The voltage level of the collector 20, when the capacitor 24 is charging, is clamped by the forward threshold voltage of the diode 28 while the voltage of the base 18, with the transistor 12 conducting, is clamped by the base to emitter voltage of the transistor 12 in its fully conductive state. Thus, for example, if the forward threshold voltage of the diode 28 is 0.4 volt, the base to emitter voltage of the transistor 12 is 0.1 volt, and $-V_2$ equals $-12$ volts, the voltage at the collector 20 is limited to $-12.4$ volts while the voltage appearing at the base terminal 18 is approximately $-0.1$ volt. Therefore, the voltage across the capacitor 24, when charged, is limited to approximately 12.3 volts.

The waveforms associated with the timing network, when the capacitor 24 is charged, are represented at a time $t_0$ in FIGURES 2a, b and c.

To initiate an output signal, a negative going input signal is applied to the base terminal 14 of the transistor 10 at a time represented at $t_1$. In response to the negative input signal, the transistor 10 becomes conductive. The negative potential at the collector 20 rises toward ground. Since the voltage across a capacitor cannot change instantaneously, the increase in the potential of the collector 20 is reflected across the capacitor 24 to the base terminal 18 of the transistor 12 causing the transistor 12 to cut off. With the transistor 12 cut off, the voltage at a collector terminal 30 of the transistor 12 drops, defining the initiation of an output signal by the timing network at an output terminal 31. The voltage level to which the collector 30 drops is controlled by a resistor 32 which is coupled between the collector 30 and the source of biasing potential $-V_2$.

The timing of the output signal is determined by the period of time for which the transistor 12 is nonconducting. The period of time for which the transistor 12 is nonconducting is, in turn, determined by the time required for the capacitor 24 to discharge to a level whereat the potential on the base terminal 18 is slightly negative allowing the transistor 12 to again become conductive.

The discharge of the capacitor is represented by the waveform illustrated in FIGURE 2b. In particular, with the transistor 12 nonconductive, the capacitor 24 rapidly discharges through a diode 34 which is coupled in parallel with the base emitter junction of the transistor 12. As the capacitor 24 rapidly discharges through the diode 34, the voltage across the capacitor 24 rapidly drops until the voltage level at the base 18 drops below the forward threshold voltage of the diode 34. At this point, represented at 36, the capacitor 24 continues to discharge more slowly through the resistor 16 until the potential at the base terminal 18 reaches approximately $-0.1$ volt. When the base terminal 18 reaches approximately $-0.1$ volt, the transistor 12 again becomes conductive raising the potential at its collector terminal 28 and terminating the output signal developed by the timing network.

Before another output signal can be initiated, the capacitor 24 must be recharged. To recharge the capacitor 24 a positive going input signal is applied to the base 14 of the transistor 10 at a time $t_2$. The positive input signal causes the transistor 10 to cut off which, in turn, causes the potential at the collector 20 to tend to drop. With the transistor 12 cut off, the capacitor 24 is again charged to approximately 12.3 volts by a current from the base 18 flowing through the capacitor 24 and the resistor 26.

Thus, in the timing network including the diode voltage regulating arrangement of the prior art, a positive going signal applied to the base terminal 14 of the transistor 10 causes the transistor 10 to be nonconductive and allows the capacitor 24 to charge from the conducting transistor 12 through the biasing resistor 26 to a voltage level determined by the forward threshold voltage of the diode 28. A negative-going signal then applied to the base terminal 14 of the transistor 10 causes the transistor 10 to become conductive, cutting off the output transistor 12 to initiate an output signal. The timing of the output signal, $T_p$, is determined by the discharge time of the capacitor 24 which discharges through the diode 34 and the resistor 16. When the capacitor 24 is substantially discharged, the transistor 12 again becomes conductive terminating the output signal.

So long as the value of the biasing potential supplied to the prior art timing network is maintained substantially constant, the capacitor 24 charges to a predetermined voltage to maintain a constant voltage swing across the capaictor in charging and discharging, thereby insuring the accurate timing of the output signals developed by the timing network. However, variations in power supply which affect the level of the biasing potential $-V_2$ result in changes in the voltage level to which the capacitor may charge and hence in undesired variations in the timing of the output signal developed by the timing network.

Variations in the voltage level to which the capacitor 24 will charge with changes in $-V_2$ are indicated in FIGURE 2b by the dotted line 38 and the broken line 40. If the level of the biasing potential $-V_2$ is increased, the capacitor 24 charges to a voltage level represented by the dotted line 38. In like manner, if the level of the biasing potential $-V_2$ decreases, the capacitor 24 charges to a voltage level represented by the broken line 40. In either event the time required for the capacitor 24 to discharge varies, resulting in variations in the timing of the output signal developed by the timing network, as represented by the dotted line 38' and the broken line 40', respectively.

To provide means for developing an output signal from a capacitor timing network, the timing of which is substantially unchanged by variations in the biasing potentials applied to the timing network, the present invention, as represented in FIGURES 3 and 5, includes a zener diode 42 coupled between a junction of the capacitor 24 and the resistor 26 and a source of biasing potential $-V_2$.

As is commonly known, a zener diode possesses a predetermined forward threshold voltage and a predetermined reverse breakdown voltage. The voltage characteristics of a zener diode are graphically represented in FIGURE 5. In particular, as the voltage difference between the anode and cathode of a zener diode is increased in a positive direction from zero, the zener diode is initially nonconductive. When the voltage reaches the forward threshold voltage of the zener diode, the zener diode is forward biased and conducts heavily-increasing voltage having little affect on the conductivity of the zener diode. In a like manner, as the voltage difference between the anode and cathode of a zener diode is increased from zero in a negative direction, the zener diode, being initially nonconductive, conducts heavily when the reverse breakdown voltage is reached and voltages having a magnitude greater than the reverse breakdown voltage of the zener diode have little affect on the conductivity of the zener diode.

In the embodiment of the present invention represented in FIGURE 3, the zener diode 42 has its cathode 44 coupled to the capacitor 24 and its anode 46 coupled to the source of biasing potential $-V_2$. The source of biasing potential $-V_2$ is positive relative to $-V_1$—the magnitude of $-V_2$ being less than the magnitude of $-V_1$. Accordingly, as described in connection with FIGURE 1, with the transistor 10 nonconducting, the capacitor 24 is charged by the source of biasing potential $-V_1$ through the base of the transistor 12 and the biasing resistor 26. However, due to the zener diode 42, the voltage level to which the capacitor 24 is charged is limited. The capacitor 24 charges until the voltage across the zener diode 42 reaches the forward threshold voltage of the zener diode at which time the zener diode becomes highly conductive, clamping the junction of the resistor 26 and the capacitor 24. Thus, if the forward threshold voltage of the zener diode is 0.4 volt and $-V_2$ equals $-12$ volts, the potential at the junction of the resistor 26 and the capacitor 24 is limited to $-12.4$ volts. With the transistor 12 conducting, the voltage level at a junction of the base 18 and the capacitor 24 is clamped by the base to emitter voltage of the transistor 12. Thus, if the base to emitter voltage of the transistor 12 is 0.1 volt, the potential at the base 18 is limited to $-0.1$ volt. Accordingly, the voltage across the capacitor 24, when charged, is limited to approximately 12.3 volts.

The waveforms associated with the timing network when the capacitor 24 is charged, are represented at time $t_0$ in FIGURES 4a, b and c.

To initiate an output signal, a negative-going input signal is applied to the base of the transistor 10 at a time $t_1$. In response to the negative input signal, transistor 10 becomes conductive. The potential at the junction of the capacitor 24 and the resistor 26 rises toward a potential determined by a voltage divider, comprising the resistor 26 and a resistor 47, which is coupled between the collector 20 and the resistor 26. The increase in potential at the junction is reflected across the capacitor 24, cutting off the transistor 12 which, in turn, initiates the output signal at the output terminal 31.

The timing of the output signal is controlled by the discharge time of the capacitor 24. With the transistor 12 nonconducting, the capacitor 24 discharges rapidly through the diode 34. However, due to the zener diode, the voltage level to which the junction of the resistor 26 and the capacitor 24 may rise and hence the voltage to which the capacitor 24 may discharge is limited. In particular, with the capacitor 24 discharging, the voltage level at the junction of the resistor 26 and the capacitor 24 rises until the voltage across the zener diode 42 reaches the reverse breakdown. At that time the zener diode 42 becomes highly conductive, clamping the junction of the capacitor 24 and the resistor 26. For example, if the reverse breakdown voltage of the zener diode is 3 volts and $-V_2$ is $-12$ volts, the junction is clamped at a potential of substantially $-9$ volts. The capacitor 24 then continues to discharge until the potential at the base 18 reaches approximately $-0.1$ volt, at which point the transistor 12 becomes conductive, terminating the output signal. Accordingly, the capacitor 24 discharges down to a voltage level of approximately 8.9 volts.

Before another output signal can be initiated, the capacitor 24 must be recharged. To recharge the capacitor 24 a positive-going input signal is applied to the base 14 of the transistor 10 at a time $t_2$. The positive input signal causes the transistor 10 to cut off which, in turn, causes the potential at the junction of the resistor 26 and the capacitor 24 to drop. With the transistor 12 cut off, the capacitor 24 is again charged to approximately 12.3 volts by a current from the base 18 flowing through the capacitor 24 and the resistor 26.

Since the forward threshold voltage of the zener diode limits the voltage level to which the capacitor 24 may charge and the reverse breakdown voltage of the zener diode limits the voltage level to which the capacitor 24 may discharge, the voltage swing across the capacitor 24 in charging and discharging is equal to a sum of the forward threshold voltage and reverse breakdown voltage of the zener diode. For the assumed values of breakdown and threshold voltage, the magnitude of the voltage swing is equal to 3.4 volts. Since the voltage characteristics of the zener diode define the voltage swing across the capacitor 24, the voltage swing is unaffected by variations in the biasing potentials applied to the timing network, thereby making the timing of the output signal independent of power supply variations. For example, as represented by the dotted line 48 in FIGURE 4b, if the level of the biasing potential $-V_2$ is increased, the voltage level to which the capacitor 24 is charged and discharged, being controlled by the forward threshold and reverse breakdown voltages of the zener diode 42, increases in a like manner. Accordingly, the voltage swing across the capacitor remains constant and since the timing of the output signal developed by the timing network is determined by the discharge time of the capacitor 24, the timing of the output signal also remains constant and unaffected by changes in the level of the biasing potentials.

As represented by the embodiment of the present invention illustrated in FIGURE 6 and having associated waveforms represented in FIGURE 7, the forward and reverse voltage characteristics of a zener diode may be employed to regulate the voltage swing on the capacitor 24 with the anode of the zener diode 42 coupled to a junction of the capacitor 24 and the resistor 26 and the cathode of the zener diode 42 coupled to the source of biasing potential $-V_2$. With the zener diode 42 so connected, the voltage level to which the capacitor 24 is charged is limited by the reverse breakdown voltage of the zener diode while the voltage level to which the capacitor 24 is discharged is limited by the forward threshold voltage of the zener diode.

More particularly, with the transistor 10 non-conducting, the capacitor 24 charges until the voltage across the zener diode 42 reaches the reverse breakdown voltage of the zener diode. When the voltage across the zener diode 42 reaches the reverse breakdown voltage, it becomes highly conductive, clamping the potential at the junction of the capacitor 24 and the resistor 26. Thus, if the reverse breakdown voltage of the zener diode 42 is 3 volts, the voltage at the junction, when the capacitor 24 is charging, is clamped at $-15$ volts.

With the transistor 10 conducting, to initiate an output signal at the output terminal 31, the capacitor 24 discharges rapidly through the diode 34. With the capacitor 24 discharging, the potential at the junction of the capacitor 24 and the resistor 26 rises until the voltage across the zener diode 42 reaches the forward threshold voltage. When the voltage across the zener diode 42 equals the forward threshold voltage the zener diode becomes highly conductive, clamping the voltage at the junction of the resistor 26 and the capacitor 24. Thus, if the forward threshold voltage of the zener diode is 0.4 volt, the junction may rise to a potential approximating −11.6 volts.

Assuming a potential of −0.1 volt on the base 18 when the transistor 12 is conducting, the capacitor 24 charges to a voltage of 14.9 volts and discharges to a voltage of 11.5 volts to define a voltage swing across the capacitor in charging and discharging which is equal to a sum of the forward threshold and reverse breakdown voltages of the zener diode 42, i.e., 3.4 volts. As described in connection with FIGURE 3, the magnitude of the voltage swing is unaffected by changes in the level of the biasing potential $-V_2$. Thus, since the voltage swing across the capacitor 24 determines the timing of the output signal developed by the timing network, the capacitor timing network of the present invention, utilizing a zener diode having its anode coupled to the timing capacitor, also develops an output signal having a timing which is invariant with changes in the level of biasing potential applied to the timing network.

Although the present invention has been described with reference to input and output transistor switches connected in a grounded emitter configuration and biasing potentials having a negative polarity, it is to be understood that other types of switches may be employed and that transistors of different configurations may be utilized with adjustments in the values and polarity of the biasing potentials without departing from the scope of the present invention. Further, the present invention has been described as utilizing the discharge of the capacitor 24 to control the timing of the output signal. However, since the voltage swing across the capacitor 24 in charging is also regulated by the zener diode 42, the charging time of the capacitor 24 may be utilized to accurately time an output signal without departing from the present invention.

What is claimed is:

1. In a timing network wherein a capacitor is charged from a first source of biasing potential and is discharged in response to the operation of a switch coupled to the capacitor, a zener diode having a predetermined forward threshold voltage and a predetermined reverse breakdown voltage coupled between a junction of the switch and the capacitor and a second source of biasing potential, the second source of biasing potential being positive relative to the first source of biasing potential whereby the capacitor is charged and discharged to voltage levels determined by the predetermined forward and reverse voltages of the zener diode to define a voltage swing across the capacitor which is invariant with changes in the biasing potentials applied to the timing network.

2. The arrangement defined in claim 1 including means responsive to the voltage swing across the capacitor for developing an output signal.

3. A timing network for developing an output signal, the timing of which is controlled by the charge or discharge time of a capacitor comprising: an input transistor; means for biasing the input transistor to be normally nonconductive and conductive in response to an input signal applied thereto; a capacitor having a first terminal connected to the input transistor; an output transistor coupled to a second terminal of the capacitor such that the capacitor is coupled for series current flow between the input and output transistors; means for biasing the output transistor to be normally conductive and nonconductive in responsive to the input signal applied to the input transistor for a period of time determined by the discharge time of the capacitor; a biasing resistor coupled between the capacitor and a first source of biasing potential such that the capacitor is charged from the conductive output transistor through the biasing resistor; means for discharging the capacitor in response to the input signal applied to the input transistor; and a zener diode having a predetermined forward threshold voltage and a predetermined reverse breakdown voltage coupled to a junction of the biasing resistor and the capacitor and a second source of biasing potential for limiting the voltage swing across the capacitor in charging and discharging to a value substantially equal to a sum of the forward threshold and reverse breakdown voltages.

4. A timing network comprising: an input transistor; means for biasing the input transistor to be normally nonconducting; an output transistor; means for biasing the output transistor to be normally conducting; a capacitor coupled for series current flow between the input transistor and the output transistor; a resistor coupled between the capacitor and a first source of biasing potential; a zener diode having a predetermined forward threshold voltage and a predetermined reverse breakdown voltage and having its cathode coupled to a junction of the capacitor and the resistor and its anode coupled to a second source of biasing potential, the second source of biasing potential being positive relative to the first source of biasing potential such that the capacitor is normally charged from the conductive output transistor through the resistor to a voltage level determined by the forward threshold voltage of the zener diode; and means for applying an input signal to the input transistor to cause the input transistor to become conducting and the output transistor to become nonconducting for a period of time determined by the time required for the capacitor to discharge to a voltage level determined by the reverse breakdown voltage of the zener diode.

5. A timing network comprising: an input transistor; means for biasing the input transistor to be normally nonconducting; an output transistor; means for biasing the output transistor to be normally conducting; a capacitor coupled for series current flow between the input transistor and the output transistor; a resistor coupled between the capacitor and a first source of biasing potential; a zener diode having a predetermined forward threshold voltage and a predetermined reverse breakdown voltage and having its anode coupled to a junction of the capacitor and the resistor and its anode coupled to a second source of biasing potential, the second source of biasing potential being positive relative to the first source of biasing potential such that the capacitor is normally charged from the conductive output transistor through the resistor to a voltage level determined by the reverse breakdown voltage of the zener diode; and means for applying an input signal to the input transistor to cause the input transistor to become conducting and the output transistor to become nonconductive for a period of time required for the capacitor to discharge to a voltage level determined by the forward threshold voltage of the zener diode.

6. In a timing network, the combination of:

a capacitor;

input switching means coupled to a first terminal of the capacitor;

output switching means arranged to operate in response to an operation of the input switching means coupled to a second terminal of the capacitor such that the capacitor is connected for series current flow between the input and output switching means;

a zener diode having a predetermined forward and reverse voltage characteristic coupled between a terminal of the capacitor and a source of biasing potential;

means for charging the capacitor through the output switching means when closed to a voltage determined by the voltage characteristic of the zener diode;

and means for discharging the capacitor through the input switching means when closed to a voltage determined by the voltage characteristic of the zener diode whereby a voltage swing is developed across the capacitor in charging and discharging substantially equal to a sum of the forward and reverse voltages of the zener diode.

7. The apparatus defined in claim 6 wherein the zener diode includes an anode and a cathode, the anode being coupled to the capacitor and the cathode being coupled to the source of biasing potential.

8. The apparatus defined in claim 6 wherein the zener diode includes an anode and a cathode, the cathode being coupled to the capacitor and the anode being coupled to the source of biasing potential.

References Cited in the file of this patent

UNITED STATES PATENTS

| | | |
|---|---|---|
| 2,892,101 | Bright | June 23, 1959 |
| 2,949,545 | White | Aug. 16, 1960 |
| 3,048,710 | Shockley | Aug. 7, 1962 |
| 3,064,143 | Sanderson | Nov. 13, 1962 |

OTHER REFERENCES

"High Speed Saw Tooth Generator," published in IBM Technical Disclosure Bulletin, vol. 2, No. 6, April 1960, page 111.